(12) United States Patent
Choi et al.

(10) Patent No.: US 9,001,283 B2
(45) Date of Patent: Apr. 7, 2015

(54) SHUTTER PANEL AND DISPLAY DEVICE INCLUDING THE SAME

(75) Inventors: Min Oh Choi, Asan-si (KR); Hee Wook Do, Cheonan-si (KR); Seungbeom Park, Seoul (KR); Sang-Gu Lee, Seoul (KR); Seunghan Jo, Seoul (KR)

(73) Assignee: Samsung Display Co., Ltd. (KR)

( * ) Notice: Subject to any disclaimer, the term of this patent is extended or adjusted under 35 U.S.C. 154(b) by 159 days.

(21) Appl. No.: 13/244,182

(22) Filed: Sep. 23, 2011

(65) Prior Publication Data
US 2012/0242917 A1    Sep. 27, 2012

(30) Foreign Application Priority Data

Mar. 24, 2011  (KR) .................. 10-2011-0026566

(51) Int. Cl.
*G02F 1/1335*   (2006.01)
*G02F 1/1343*   (2006.01)
*G02F 1/1347*   (2006.01)

(52) U.S. Cl.
CPC ...... *G02F 1/134309* (2013.01); *G02F 1/13471* (2013.01)

(58) Field of Classification Search
USPC .......................................... 349/15
See application file for complete search history.

(56) References Cited

U.S. PATENT DOCUMENTS

| 2005/0117216 A1* | 6/2005 | Lee ............................ 359/464 |
| 2010/0091227 A1* | 4/2010 | Chen et al. ................... 349/122 |
| 2011/0001894 A1* | 1/2011 | Owaku et al. .................. 349/15 |
| 2011/0043715 A1* | 2/2011 | Ohyama et al. ................. 349/15 |
| 2011/0149182 A1* | 6/2011 | Fukami et al. .................. 349/13 |
| 2012/0019752 A1* | 1/2012 | He et al. ....................... 349/117 |
| 2013/0002996 A1* | 1/2013 | Robinson et al. ............... 349/96 |

FOREIGN PATENT DOCUMENTS

| JP | 2005-258013 A | 9/2005 |
| JP | 2007-003910 A | 1/2007 |
| KR | 100445613 B1 | 8/2004 |

* cited by examiner

*Primary Examiner* — Dennis Y Kim
(74) *Attorney, Agent, or Firm* — Innovation Counsel LLP

(57) ABSTRACT

Provided is a shutter panel including a first substrate on which a plurality of electric field forming electrodes are parallel to each other, a second substrate opposed to the first substrate, and a liquid crystal layer disposed on the first and second substrates. Each of the electric field forming electrodes has both side surfaces facing the adjacent electric field forming electrodes, and both side surfaces are provided with protrusion parts protruding toward the adjacent electric field forming electrodes.

6 Claims, 5 Drawing Sheets

SHUTTER PANEL AND DISPLAY DEVICE INCLUDING THE SAME

CROSS-REFERENCE TO RELATED APPLICATIONS

This U.S. non-provisional patent application claims priority under 35 U.S.C. §119 of Korean Patent Application No. 10-2011-0026566, filed on Mar. 24, 2011, the entire contents of which are hereby incorporated by reference.

BACKGROUND

The present disclosure relates to a shutter panel and a display device including the shutter panel, and more particularly, to a shutter panel for displaying a three-dimensional image, and a three-dimensional image display device including the shutter panel.

Three-dimensional image display devices include a display panel and a shutter panel that divides an image into a left-eye image and a right-eye image to provide a binocular disparity. When a user sees a left-eye image and a right-eye image with his/her eyes, his/her brain combines the left-eye image and the right-eye image and perceives them as a three-dimensional image.

A shutter panel of a three-dimensional image display device has a liquid crystal panel structure, which includes two glass substrates provided with a transparent electrode and a liquid crystal layer between the glass substrates. Electrodes including a transparent conductive material are typically arrayed in a striped pattern on one of the glass substrates.

Since the refractive index of the liquid crystal layer at the electrode, however, is different from the refractive index of the liquid crystal layer in a region between the electrodes, the region between the electrodes may be perceived as a line. This line may result in a degradation of the perceived three-dimensional image.

SUMMARY

The present disclosure provides a shutter panel for displaying a three-dimensional image, in which a region between electrode patterns is not perceived.

The present disclosure also provides a display device for displaying a three-dimensional image, which includes the shutter panel.

Embodiments of the inventive concept provide shutter panels including a first substrate on which a plurality of electric field forming electrodes are parallel to each other; a second substrate opposed to the first substrate; and a liquid crystal layer disposed on the first and second substrates, wherein each of the electric field forming electrodes has at least one side surface facing an adjacent electric field forming electrode, and at least one side surface is provided with protrusion parts protruding toward the adjacent electric field forming electrode.

In some embodiments, one of the side surfaces of the electric field forming electrode may be provided with a first protrusion part, and the other of the side surfaces may be provided with a second protrusion part.

In other embodiments, the first and second protrusion parts may include a plurality of protrusions.

In yet other embodiments, the protrusion of the first protrusion part may protrude to a boundary with the protrusions of the second protrusion part.

In still other embodiments, a peak of the protrusions may have a height that is equal to or greater than half a distance between the neighboring electric field forming electrodes.

In even other embodiments, a distance between the first slope and the third slope, and a distance between the second slope and the fourth slope may range from about 3 μm to about 5 μm.

In further embodiments, a protrusion height of the first protrusion part at an arbitrary position may be different from a protrusion height of the second protrusion part at a position corresponding to the arbitrary position.

In still further embodiments, the first and second protrusion parts may have surfaces parallel to each other in arbitrary ranges corresponding to each other.

In even further embodiments, the first and second protrusion parts may have curved surfaces that are not parallel to each other in arbitrary ranges corresponding to each other.

In still other embodiments of the inventive concept, a 3-D display device includes a display panel displaying an image, and a shutter panel disposed on a light emitting side of the display panel.

BRIEF DESCRIPTION OF THE DRAWINGS

The accompanying figures are included to provide a further understanding of the inventive concept, and are incorporated in and constitute a part of this specification. The drawings illustrate exemplary embodiments of the inventive concept and, together with the description, serve to explain principles of the inventive concept. In the figures.

DETAILED DESCRIPTION OF THE EMBODIMENTS

Figure 1:
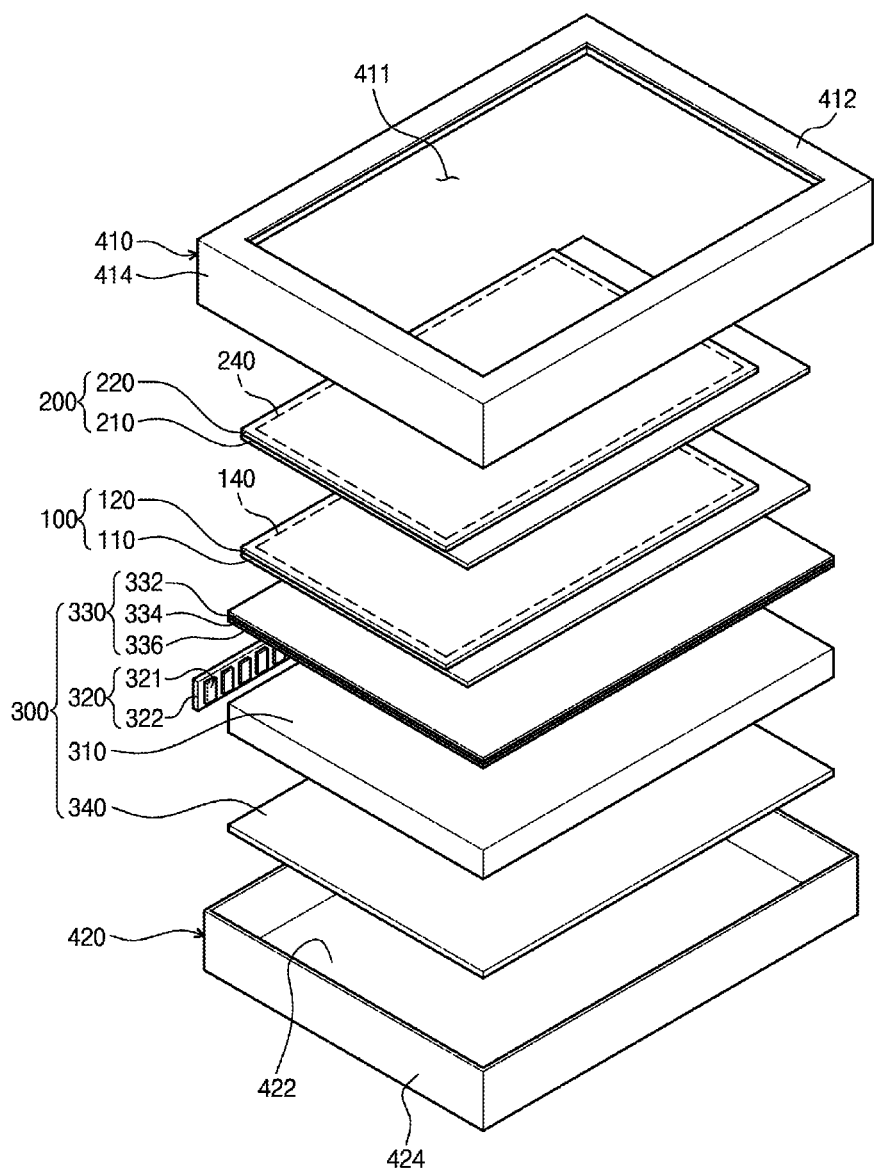
FIG. 1 is an exploded perspective view illustrating a three-dimensional (3-D) image display device according to an embodiment of the inventive concept.

Since the inventive concept may have diverse modified embodiments, exemplary embodiments are illustrated in the drawings and are described in the detailed description of the invention. However, this does not limit the inventive concept within specific embodiments and it should be understood that the inventive concept covers all the modifications, equivalents, and replacements within the idea and technical scope of the inventive concept.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment. The terms of a singular form may include plural forms unless referred to the contrary.

The meaning of 'comprise', 'include', or 'have' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. In the specification, it will be understood that when a layer (or film), a region, or a plate is referred to as being 'under' another layer, region, or plate, it can be directly under the other layer, region, or plate, or intervening layers, regions, or plates may also be present.

Exemplary embodiments of the inventive concept will now be described in detail with reference to the accompanying drawings.

Figure 2:
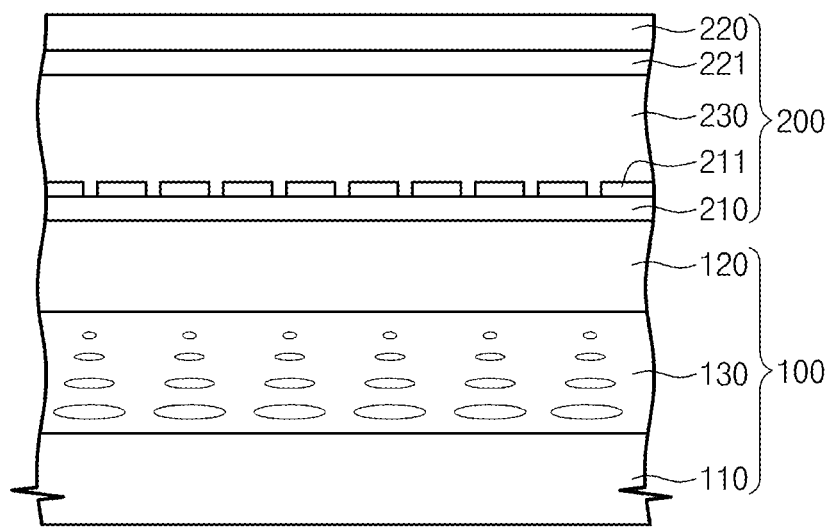
FIG. 2 is a partial cross-sectional view illustrating a display panel and a shutter panel in the 3-D image display device of FIG. 1.

FIG. 1 is an exploded perspective view illustrating a three-dimensional (3-D) image display device according to an embodiment of the inventive concept. FIG. 2 is a partial cross-sectional view illustrating a display panel and a shutter panel in the 3-D image display device of FIG. 1.

Referring to FIGS. 1 and 2, a display device 500 according to the current embodiment includes a display panel 100, a shutter panel 200, a backlight unit 300, an upper cover 410, and a lower cover 420.

The display panel 100 may be a liquid crystal display (LCD) panel, an electrophoretic display panel (EDP), an organic light-emitting display (OLED) panel, or a plasma display panel (PDP). In the current embodiment, a liquid crystal display panel is exemplified as the display panel 100.

The display panel 100 has a rectangular plate shape with long sides and short sides, and displays an image in a display region 140. The display panel 100 includes an array substrate 110, an opposite substrate 120 opposed to the array substrate 110, and a first liquid crystal layer 130 disposed between the array substrate 110 and the opposite substrate 120.

According to an embodiment of the inventive concept, the array substrate 110 may include a plurality of pixels (not shown) in a matrix shape. A light blocking film (not shown) is disposed between the pixels to prevent an interference of light passing through the pixel, thereby improving contrast of the display panel 100. Each pixel is provided with a gate line (not shown), a data line (not shown), and a pixel electrode (not shown). The gate line extends in a first direction, e.g., in a direction parallel to a side of the array substrate 110. The data line (not shown) extends in a second direction perpendicular to the first direction, crosses the gate line, and is electrically insulated from the gate line. Also, each pixel is provided with a thin film transistor (not shown) that is electrically connected to the gate line, the data line, and the pixel electrode. The pixels correspond to pixel electrodes, respectively. The thin film transistor switches a driving signal that is provided to the corresponding pixel electrode.

A driver IC (not shown) may be disposed at a side of the array substrate 110. The driver IC receives various signals, and outputs the driving signal for driving the display panel 100, to the thin film transistor in response to various input control signals.

The opposite substrate 120 may include an RGB color filter (not shown) and a common electrode (not shown) on a surface thereof. The RGB color filter receives light from the backlight unit 300 to create a predetermined color. The common electrode is disposed on the RGB color filter and corresponds to the pixel electrode. The RGB color filter may be formed through a thin film process. The RGB color filter is disposed on the opposite substrate 120 in the embodiment, but the inventive concept is not limited thereto. For example, the RGB color filter may be disposed on the array substrate 110.

The first liquid crystal layer 130 has a specific arrangement direction according to a voltage applied to the pixel electrode and the common electrode, thereby to adjust the transmissivity of light emitted from the backlight unit 300, so that display panel 100 can display an image.

The display panel 100 may further include a polarization film (not shown) at a light emitting side, that is, the side adjacent to the shutter panel 200.

The shutter panel 200 divides an image transmitted by the display panel 100 into a left-eye image and a right-eye image. The shutter panel 200 may have a transmission region 240 corresponding to the display region 140. The shutter panel 200 includes a first substrate 210 at the side where the display panel 100 transmits light; a second substrate 220 opposed to the first substrate 210; and a second liquid crystal layer 230 (See FIG. 2) between the first and second substrates 210 and 220. A plurality of electric field forming electrodes 211 for forming an electric field are disposed on a surface of the first substrate 210 adjacent to the second liquid crystal layer 230. A common electrode 221 may be disposed on a surface of the second substrate 220 adjacent to the second liquid crystal layer 230.

A polarization film (not shown) may be disposed at the side of the first substrate 210 adjacent to the display panel 100. Also, a polarization film (not shown) may be disposed at the side of the second substrate 220 where light is emitted.

The backlight unit 300 is disposed at the side of the display panel 100 that is opposite to the side where an image is transmitted. The backlight unit 300 includes a light guide panel 310, a light source part 320 including a plurality of light sources, an optical member 330, and a reflective sheet 340.

The light guide panel 310 is disposed under the display panel 100, and guides light emitted from the light source part 320 to the display panel 100. Particularly, the light guide panel 310 overlaps at least the display region 140 of the display panel 100. The light guide panel 310 includes a light emitting surface for emitting light; a bottom surface opposed to the light emitting surface; and side surfaces connecting the light emitting surface to the bottom surface. At least one of the side surfaces may be a light incident surface facing the light source part 320 and receiving light emitted from the light source part 320. The side surface opposed to the light incident surface may be a light facing surface for reflecting light.

The light source part 320 may be formed by mounting a plurality of light sources 321, e.g., a plurality of light-emitting diodes on a printed circuit board (PCB) 322. The light source part 320 faces at least one of the side surfaces of the light guide panel 310 and emits light that is guided by the light guide panel 310 and passes through the display panel 100 to display an image.

The optical member 330 is disposed between the light guide panel 310 and the display panel 100. The optical member 330 controls light emitted from the light source part 320 through the light guide panel 310. The optical member 330 includes a diffusion sheet 336, a prism sheet 334, and a protective sheet 332, which are sequentially stacked.

The diffusion sheet 336 diffuses light emitted from the light guide panel 310. The prism sheet 334 collects light, diffused by the diffusion sheet 336, in a direction perpendicular to a plane of the display panel 100 disposed over the prism sheet 334. Most of the light passing through the prism sheet 334 is perpendicularly incident on the display panel 100. The protective sheet 332 is disposed on the prism sheet 334. The protective sheet 332 protects the prism sheet 334 from external shock.

In the current embodiment, the optical member 330 includes one diffusion sheet as the diffusion sheet 336, one prism sheet as the prism sheet 334, and one protective sheet as the protective sheet 332, but the inventive concept is not limited thereto. At least one of a diffusion sheet 336, a prism sheet 334, and a protective sheet 332 may be provided in plurality to the optical member 330, or one of a diffusion sheet 336, a prism sheet 334, or a protective sheet 332 may be removed.

The reflective sheet 340 reflects otherwise wasted light back to the display panel 100, and is disposed under the light guide panel 310. The reflective sheet 340 includes a light reflecting material. The reflective sheet 340 is disposed on the lower cover 420 to reflect light emitted from the light source 320. Thus, the reflective sheet 340 increases the amount of light provided to the display panel 100.

The upper cover 410 is disposed over the display panel 100, and has a shape corresponding to the shape of the display panel 100. The upper cover 410 includes a display window 411 exposing the transmission region 240 of the shutter panel 200; an upper part 412 supporting an edge of the top surface of the display panel 100; and an upper cover side wall 414 bent from the upper part 412 and extending to the lower cover 420. Since the display panel 100 has a rectangular plate shape, the upper cover side wall 414 may have four side surfaces. The upper cover 410 is coupled to the lower cover 420 to support the edge of the top surface of the display panel 100.

The lower cover 420 is disposed under the backlight unit 300. The lower cover 420 includes a bottom 422 having a shape corresponding to the shapes of the display panel 100 and the backlight unit 300; and a lower cover side wall 424 bent and extending upward from the bottom 422. Since the display panel 100 and the backlight unit 300 have a tetragonal shape, the lower cover side wall 424 may have four side surfaces. The lower cover 420 is provided with a space for accommodating the display panel 100 and the backlight unit 300 by the bottom 422 and the lower cover side wall 424. The lower cover 420 is coupled to the upper cover 410 to accommodate and support the display panel 100 and the backlight unit 300.

Figure 3:
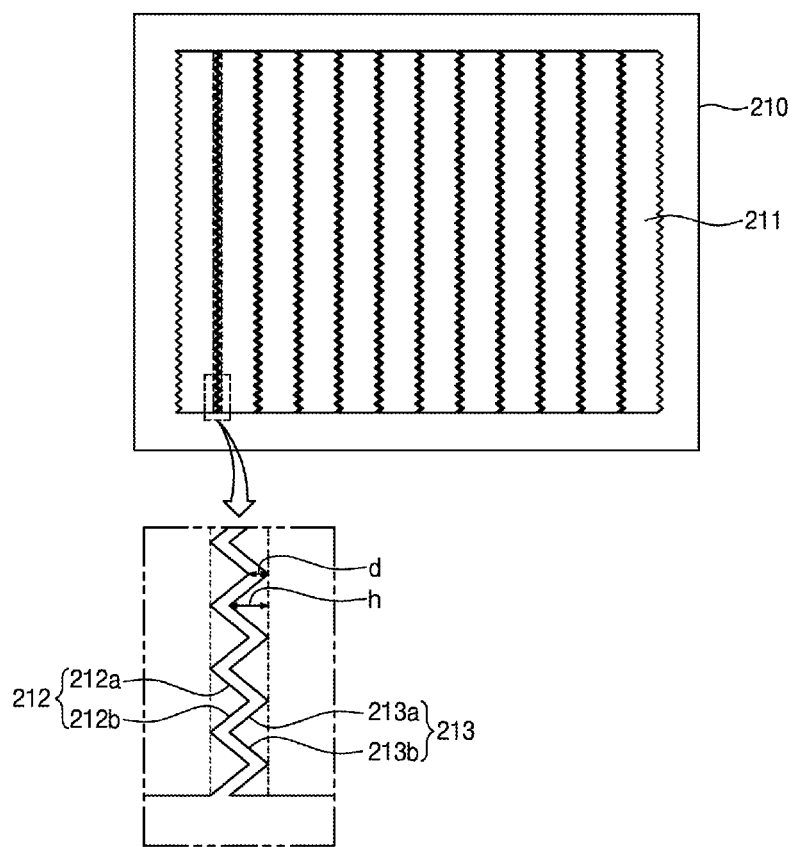
FIG. 3 is a plan view illustrating a first substrate provided with electric field forming electrodes of a shutter panel in the 3-D image display device of FIG. 1.

FIG. 3 is a plan view illustrating a first substrate provided with electric field forming electrodes of a shutter panel in the 3-D image display device of FIG. 1.

Referring to FIG. 3, the electric field forming electrodes 211 are spaced a constant distance from one another and are parallel to one another on a surface of the first substrate 210. Side surfaces of the electric field forming electrodes 211 may be provided with protrusion parts 212 and 213 that protrude toward the adjacent electric field forming electrodes 211. For example, one of the side surfaces of the electric field forming electrode 211 may be provided with a first protrusion part (also denoted by 212), and the other may be provided with a second protrusion part (also denoted by 213). The first and second protrusion parts 212 and 213 include a plurality of protrusions, respectively, which protrude to the adjacent electric field forming electrodes 211. The protrusion of the first protrusion part 212 protrudes to a boundary between the protrusions of the second protrusion part 213.

Peaks of the protrusions have a height h that is equal to or greater than half a distance between the neighboring electric field forming electrodes 211 (h≥d/2). That is, for example, the height h of the peak of the protrusion provided to the second protrusion part 213 may be greater than a distance d between the electric field forming electrode 211 and the peak of the protrusion of the first protrusion part 212 on the adjacent electric field forming electrode 211. Accordingly, a region between the neighboring electric field forming electrodes 211 parallel to one another is prevented from overlapping the light blocking film of the display panel 100, and thus, is prevented from being perceived as a black line.

The protrusions of one of the first and second protrusion parts 212 and 213, for example, the protrusions of the first protrusion part 212 may include first slopes 212a and second slopes 212b. The protrusions of one of the first and second protrusion parts 212 and 213, for example, the protrusions of the second protrusion part 213 may include third slopes 213b parallel to the first slopes 212a, and fourth slopes 213a parallel to the second slopes 212b. A distance between the first slope 212a and the third slope 213b, and a distance between the second slope 212b and the fourth slope 213a may range from about 3 µm to about 5 µm.

Since the electric field forming electrodes 211 of the shutter panel 200 are provided with the first and second protrusion parts 212 and 213 including the protrusions protruding to the adjacent electric field forming electrodes 211, regions between the electric field forming electrodes 211 are prevented from being perceived.

Hereinafter, another embodiment of the inventive concept will now be described with reference to FIG. 4. Like reference numerals refer to like elements in FIGS. 1 through 4, and a description of the same components as those of FIGS. 1 through 3 will be omitted in the current embodiment. Thus, the current embodiment will now be described with respect to a different part as those of FIGS. 1 through 3.

Figure 4:
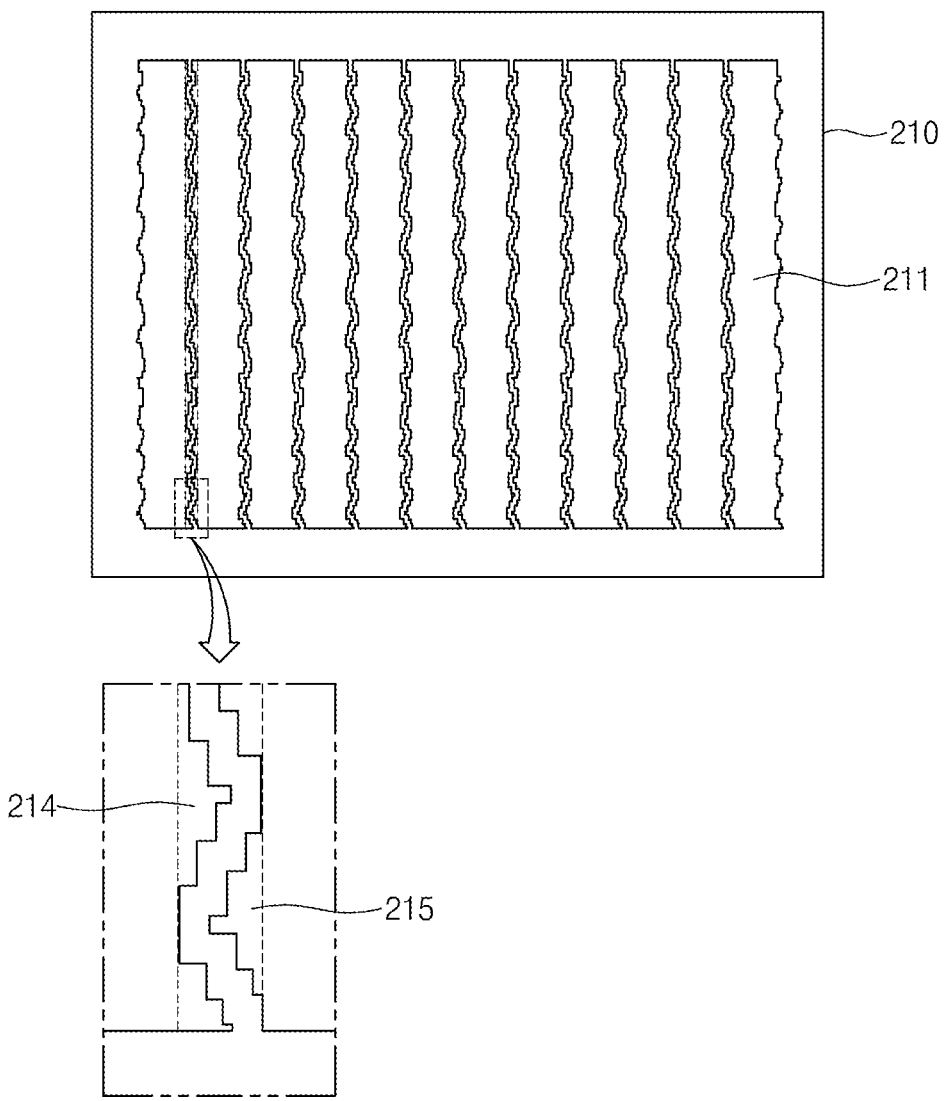
FIG. 4 is a plan view illustrating a substrate provided with electric field forming electrodes in a 3-D image display device according to another embodiment of the inventive concept.

FIG. 4 is a plan view illustrating a substrate provided with electric field forming electrodes in a 3-D image display device according to the current embodiment.

Referring to FIG. 4, each of electric field forming electrodes 211 may be provided with protrusion parts 214 and 215 on both side surfaces thereof. Protrusion parts 214 and 215 protrude to the adjacent electric field forming electrodes 211, and may have irregular, or non-repeating, profiles. For example, one of both the side surfaces of the electric field forming electrode 211 may be provided with a third protrusion part (also denoted by 214), and the other may be provided with a fourth protrusion part (also denoted by 215). The third protrusion part 214 and the fourth protrusion part 215 have different protrusion heights at an arbitrary position of the electric field forming electrode 211. The sum of protrusion heights of the third and fourth protrusion parts 214 and 215 at an arbitrary position of the electric field forming electrode 211 may be equal to or greater than half a distance between the neighboring electric field forming electrodes 211.

The third protrusion part 214 and the fourth protrusion part 215 have parallel surfaces to each other in an arbitrary range of the electric field forming electrode 211.

A distance between the third and fourth protrusion parts 214 and 215 of the neighboring electric field forming electrodes 211 may range from about 3 µm to about 5 µm.

Hereinafter, another embodiment of the inventive concept will now be described with reference to FIG. 5. Like reference numerals refer to like elements in FIGS. 1 through 5, and a description of the same components as those of FIGS. 1 through 4 will be omitted in the current embodiment. Thus, the current embodiment will now be described with respect to a different part as those of FIGS. 1 through 4.

Figure 5:
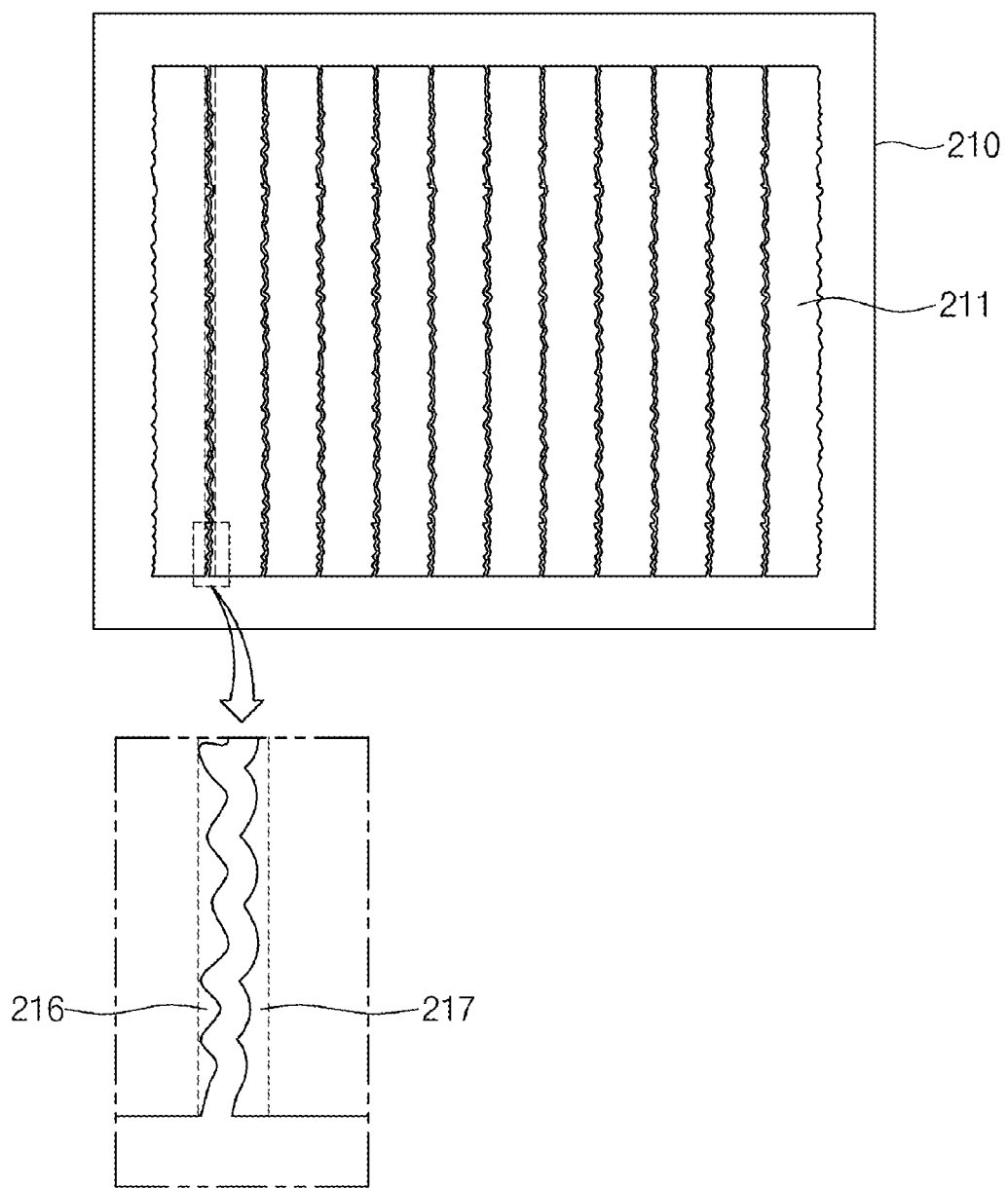
FIG. 5 is a plan view illustrating a substrate provided with electric field forming electrodes in a 3-D image display device according to still another embodiment of the inventive concept.

FIG. 5 is a plan view illustrating a substrate provided with electric field forming electrodes in a 3-D image display device according to the current embodiment.

Referring to FIG. 5, each of electric field forming electrodes 211 may be provided with a fifth protrusion part 216 on one of both side surfaces thereof, and a sixth protrusion part 217 on the other. The fifth protrusion part 216 and the sixth protrusion part 217 have different protrusion heights at an arbitrary position of the electric field forming electrode 211. The sum of protrusion heights of the fifth and sixth protrusion parts 216 and 217 at an arbitrary position of the electric field forming electrode 211 may be equal to or greater than half a distance between the neighboring electric field forming electrodes 211.

The fifth and sixth protrusion parts 216 and 217 may have curved surfaces that are not parallel to each other in an arbitrary range.

As described above, the shutter panel prevents the region between the electric field forming electrodes from being perceived.

Thus, the region between the electric field forming electrodes in the 3-D image display device is not perceived.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A shutter panel comprising:
   a first substrate on which a plurality of electric field forming electrodes are parallel to each other;
   a second substrate opposed to the first substrate; and
   a liquid crystal layer disposed on the first and second substrates,
   wherein each of the electric field forming electrodes has at least one side surface facing an adjacent electric field forming electrode, and at least one side surface is provided with protrusion parts protruding to the adjacent electric field forming electrode, each of the electric field forming electrodes includes a straight central portion from which the protrusion parts protrude, and a width of the protrusion parts at a line along the straight central portion at a base of the protrusion parts is wider than a width of the protrusion part at an edge of the electric field forming electrode;
   wherein one of the electric field forming electrodes has one of the side surfaces provided with a first protrusion part, and the other of the side surfaces provided with a second protrusion part,
   wherein the first and second protrusion parts comprise a plurality of protrusions,
   wherein a protrusion height of the first protrusion part at an arbitrary position is different from a protrusion height of the second protrusion part at a position corresponding to the arbitrary position,
   wherein the first and second protrusion parts have curved surfaces that are not parallel to each other in arbitrary ranges corresponding to each other.

2. The shutter panel of claim 1, wherein protrusions of the first protrusion part protrude to a boundary with the protrusions of the second protrusion part.

3. The shutter panel of claim 1, wherein a sum of protrusion heights of the first and second protrusion parts at arbitrary positions corresponding to each other is equal to or greater than half a distance between the neighboring electric field forming electrodes.

4. A display device comprising:
   a display panel displaying an image; and
   a shutter panel dividing a planar image from the display panel into a left-eye image and a right-eye image,
   wherein the shutter panel comprises:
   a first substrate on which a plurality of electric field forming electrodes are parallel to each other, the first substrate being disposed on a light emitting side of the display panel;
   a second substrate opposed to the first substrate; and
   a liquid crystal layer disposed on the first and second substrates,
   wherein each of the electric field forming electrodes has at least one of its side surfaces facing an adjacent electric field forming electrode, and the other side surface is provided with protrusion parts protruding to the adjacent electric field forming electrode, and wherein each of the electric field forming electrodes includes a straight central portion from which the protrusion parts protrude, and a width of the protrusion parts from a line along the straight central portion at a base of the protrusion parts is wider than a width of the protrusion parts at an edge of the electric field forming electrode;
   wherein one of the electric field forming electrodes has one of the side surfaces provided with a first protrusion part, and the other of the side surfaces provided with a second protrusion part,
   wherein a protrusion height of the first protrusion part at an arbitrary position is different from a protrusion height of the second protrusion part at a position corresponding to the arbitrary position,
   wherein the first and second protrusion parts have curved surfaces that are not parallel to each other in arbitrary ranges corresponding to each other.

5. The display device of claim 4, wherein the first and second protrusion part comprise a plurality of protrusions.

6. The display device of claim 5, wherein protrusions of the first protrusion part protrude to a boundary with the protrusions of the second protrusion part.

* * * * *